United States Patent
Zheng

(10) Patent No.: US 9,875,350 B2
(45) Date of Patent: Jan. 23, 2018

(54) MULTI-VOCAL PASSWORD VERIFYING METHOD AND DEVICE

(71) Applicants: Smart Electronic Industrial (Dong Guan) Co., Ltd., Dongguan (CN); Lee Zheng, Dongguan (CN)

(72) Inventor: Lee Zheng, Dongguan (CN)

(73) Assignees: Smart Electronic Industrial (Dong Guan) Co., Ltd. (CN); Lee Zheng (CN)

(*) Notice: Subject to any disclaimer, the term of this patent is extended or adjusted under 35 U.S.C. 154(b) by 159 days.

(21) Appl. No.: 14/406,894

(22) PCT Filed: Jul. 4, 2014

(86) PCT No.: PCT/CN2014/081682
§ 371 (c)(1),
(2) Date: Dec. 10, 2014

(87) PCT Pub. No.: WO2015/180235
PCT Pub. Date: Dec. 3, 2015

(65) Prior Publication Data
US 2016/0026784 A1   Jan. 28, 2016

(30) Foreign Application Priority Data
May 28, 2014  (CN) .......................... 2014 1 0231463

(51) Int. Cl.
*G06F 21/00*  (2013.01)
*G06F 21/36*  (2013.01)
(Continued)

(52) U.S. Cl.
CPC .............. *G06F 21/36* (2013.01); *G06F 21/31* (2013.01); *G06F 21/45* (2013.01)

(58) Field of Classification Search
CPC .......... G06F 21/31; G06F 21/32; G06F 21/36; G06F 21/45; G06F 21/30
See application file for complete search history.

(56) References Cited

U.S. PATENT DOCUMENTS

| | | | | |
|---|---|---|---|---|
| 2007/0192615 A1* | 8/2007 | Varghese | ................ | G06F 21/36 713/182 |
| 2012/0036573 A1* | 2/2012 | Yang | ....................... | G06F 21/34 726/16 |
| 2016/0028730 A1* | 1/2016 | Natarajan | ............... | G06F 21/31 726/6 |

* cited by examiner

*Primary Examiner* — Edward Zee
(74) *Attorney, Agent, or Firm* — Lerner, David, Littenberg, Krumholz & Mentlik, LLP

(57) ABSTRACT

A multi-vocal password verifying method includes the steps of: (1) displaying at least one set of candidate information units, the information units of the password being included in at least one set of candidate information units for being chosen; (2) accepting setting of relative location between a target selection region and the candidate information units such that the number of the candidate information units covered by the target selection region is two or more, the candidate information units covered by said target selection region being defined as a selection information unit set; and (3) comparing the information units of the password with the selection information unit set, and it being determined that the user has chosen correct information units from the predefined password when the selection information unit set contains the information units of the password. The password verification performed by the present multi-vocal password verifying method brings good effects such as vagueness of explicit expression and use convenience of user operation, and is therefore more reliable.

27 Claims, 4 Drawing Sheets

(51) Int. Cl.
*G06F 21/31* (2013.01)
*G06F 21/45* (2013.01)

MULTI-VOCAL PASSWORD VERIFYING METHOD AND DEVICE

CROSS-REFERENCE TO RELATED APPLICATIONS

The present application is a national phase entry under 35 U.S.C. § 371 of International Application No. PCT/CN2014/081682 filed Jul. 4, 2014, which claims priority from Chinese Application No. 201410231463.9, filed May 28, 2014, all of which are hereby incorporated herein by reference.

FIELD OF THE INVENTION

The present invention relates to an electronic safety protection technology and more particularly, relates to a multi-vocal password verifying method and a password verifying device for performing the same method.

BACKGROUND OF THE INVENTION

With continuous improvement of people life quality and deep understanding of safety, password verifying device and corresponding verifying method have been widely used in various areas of people life. In a typical situation, presently almost every person owns at least one mobile phone or tablet computer and in these devices, employment of verification method may be often found. In fact this is specific utilization of verification devices. For a mobile terminal, a display screen based on touch-feedback principle is generally provided. The most convenient manners may include slide-unlock, face-unlock, unlock by drawing a particular pattern in a nine-grid screen and the like all of which are well known publicly. All these manners suffer from some drawbacks. For example, slide-unlock may be seen by others completely; face-unlock may be cracked by static image; and unlock by drawing a particular pattern in a nine-grid screen is indeed a variation of nine-grid numerical keyboard and, it may also be easily seen by others and thus be cracked. Apparently, these prior art password verification manners used in mobile terminals all lack of sufficient safety and reliability and therefore are susceptible to being cracked by intentional peeping.

Earlier verification technology was mostly performed mechanically. For instance, combination lock extensively shown in kinds of bags and suitcases is also one of password verification device. This kind of verification device running mechanically similarly suffers from well-known disadvantages and as a result, electronic verification devices will gradually replace the mechanical verification device. As such, password verification device may be applied not only in various electronic mobile terminals, but also in other situations where password verification is necessary. For example kinds of travel bags, suitcases may use verification device in their electronic lock verification mechanism. Take another example, domestic electronics such as smart TV, router capable of human-machine interaction or central control device may use above device in their verification procedure. Take a further example, the above verification device may also find its application in access control system, electronic locks of a vending machine, strongbox and automobile gate. It may even be used in any new products that may immerge in future and that may require verification of password. Understandingly, password verification device is so important that it have great influence on various aspects of human life. Accordingly, it is desired to provide a good password verifying device and corresponding method in pursuit of higher and higher safety.

As described above however, though the password verification device is much important, currently available verification methods are not so satisfactory. During industry design process, designers should consider not only performance and safety of the product as discussed above, but also production cost and convenience of the product. Therefore, driven by balance among these industrial factors, verification techniques have been advanced gradually.

Patent Publication No.: CN103632075A published on Mar. 12, 2014 discloses an authenticating device and corresponding method. The solution disclosed in this reference is somewhat similar to the present invention and may in some terms solve the problems of the invention. However, the solution in above reference still has space to be improved.

At first, this method suffers from bad interaction and weak operation experience because in this method a set of candidate character is dynamically distributed to multiple candidate subsets and these candidate subsets are displayed in a fixed location.

Secondly, regarding safety, candidate characters displayed on screen are still susceptible to being seen or recorded. In theory, a stealer may remember several operations of the user in inputting a password and then guess the correct password by trying every possibility. Accordingly, safety is weak.

Finally, in terms of easy use, password verification should bring good human-machine interaction results, while in terms of safety, care should be taken that explicit password is multi-vocal and input of the password should be simple. Though multi-vocal expression conflicts with simple input, there is room to make some improvement.

SUMMARY OF THE INVENTION

One major object of the invention is to overcome drawbacks of prior art technology and provide a multi-vocal password verifying method which is capable of expressing candidate explicit password of the password to be verified in a multi-vocal manner and also capable of ensuring safety and easy use.

Another object of the invention is to provide a corresponding password verifying device.

To above ends, the following technical solution is proposed.

According to the invention, a multi-vocal password verifying method for verifying whether a user has chosen correct information units from a predefined password consisted of a number of information units, includes the steps of:

(1) displaying at least one set of candidate information units, the information units of the password being included in at least one set of candidate information units for being chosen;

(2) accepting setting of relative location between a target selection region and the candidate information units such that the number of the candidate information units covered by the target selection region is two or more, the candidate information units covered by said target selection region being defined as a selection information unit set; and (3) comparing the information units of the password with the selection information unit set, and it being determined that the user has chosen correct information units from the predefined password when the selection information unit set contains the information units of the password.

According to what is disclosed by an embodiment of the invention, in the step (1), the number of the sets of candidate information units is one or more; and all candidate information units of all sets of candidate information units are statically displayed with their locations being fixed. By this manner, better visualization effect can be obtained thus improving convenience of user operation.

According to another embodiment, in the step (1), the number of the sets of candidate information units is one or more; and at least part of candidate information units of at least one set of candidate information units are dynamically displayed with their locations being changed in real time. By this manner, more blurred visualization effect can be obtained so as to reduce risk of being watched.

According to what is disclosed by an embodiment of the invention, the target selection region has a defined location; two or more candidate information units of the dynamically displayed set of candidate information unit are covered by the target selection region at a time; and when triggered by instructions of the user, all candidate information units covered currently by the target selection region are chosen as the selection information unit set. By this manner, times of human-machine interactions are reduced.

According to what is disclosed by an embodiment of the invention, location of any candidate information unit determined by the user is received such that several candidate information units are covered by the target selection region so as to realize subsequent selection. By this way, the user can manipulate the candidate information unit so that the user can himself set the degree of multi-vocality of the verification process.

The location of the target selection region determined by the user is received such that several candidate information units are covered by the target selection region so as to realize subsequent selection. By this way, the user can manipulate the candidate information unit so that the user can himself set the degree of multi-vocality of the verification process. Preferably, the location of the target selection region is finally determined by the user; and when the target selection region is finally determined by the user all the candidate information units covered by the target selection region constitute the selection information unit set. Any one of two manners listed below may be used to enhance human-machine interaction experience.

According to one manner, the target selection region moves with its location being changed; and the location of the target selection region is determined when the instructions or a second instruction are issued by the user. All the candidate information units covered by the region at this time form the selection information unit set. This will provide more dynamic user interface thus improving safety.

According to another manner, the initial location of the target selection region is determined; the target selection regions begins to move when the instructions of the user are issued; when the instruction is finished or after the second instruction is issued by the user, the location of the region is fixed; and all the candidate information units covered by the region at this time form the selection information unit set. Therefore, the user can control location with higher accuracy.

Preferably, there are multiple sets of candidate information units; and the candidate information units covered by the target region come from at least two sets of candidate information units. The multiple sets of candidate information units will certainly increase safety.

Preferably, there are multiple sets of candidate information units; and each set of candidate information units are confined in a specific display region and are displayed thereby. This can be done by following two means.

According to one means, the display region of each set of candidate information units is of a circle or arc shape; and the display regions of several sets of candidate information units are concentric with each other.

According to another means, the display region of each set of candidate information units is of a rectangular shape; and the display regions of several sets of candidate information units are arranged side by side or parallel to each other.

Preferably, when the candidate information unit is moveably displayed, its movement range is limited to a specific display region corresponding to the set of candidate information units.

By limiting of movement range of the unit, expression of the same unit becomes more regular and accordingly, friendly human-machine interaction interface is provided while still maintaining multi-vocality. In addition, it is advantageous to ensure convenience in interaction.

In the step (1), each set of candidate information units includes not only candidate information units to be determined as the information units containing the password, but also other candidate information units different from the information units of the password. By providing other candidate information units different from the information units of the password, complexity of password verification is increased and as a result, safety of password verification is enhanced.

In one embodiment of the invention, all the candidate information units of all sets of candidate information units are displayed in a floating animation. By use of single or multiple candidate information units, vagueness is increased and it becomes hard to notice and remember the password.

Preferably, an instruction input source, which is corresponding to the selection of the target region, is provided by anyone or more of the following components: microphone, gyro, physical button, touch screen, camera head, infra-red sensor and vibration sensor. Consequently, the user may use various input sources to input selection instructions. In these situations, kinds of control means including voice, controlling of attitude of the device, controlling of navigation key or other types of keys, pressing or sliding on the screen, blinking, gesture or swaying the device, may be utilized to select specific instruction.

Preferably, the candidate information unit includes visual information. Specifically, the candidate information unit is any one or combination of the following information elements: character, color, font, font size, pattern or image. In one embodiment, the candidate information unit is a character combined with color; and in the step (1), the character is displayed in said color. By incorporating with kinds of visualized express information, the complexity of the candidate information units is significantly strengthened, thereby intensifying complexity of the password verification process and further making it difficulty to crack the password. Even in case that the data stream is intercepted by a stealer, it is still hard for him to crack the correct password by analysis of intercepted data stream due to the diversification of expression and inclusion of kinds of information elements for a candidate information unit, thus improving safety greatly.

Preferably, each candidate information unit contains two or more said information elements. More than two candidate information units of a set of candidate information unit share at least one completely identical information element; or, more than one candidate information units of different sets of candidate information units share at least one completely identical information element. By sharing of the identical information element by these candidate information units, multi-vocality of password verification is further increased.

In detail, covering of the candidate information units by the target region means that in a visual plane, the candidate information units fall within the boundary of the target region and/or cross the boundary. By this manner, human-machine interaction process is more intuitive and definite.

Furthermore, at least one of the target region and candidate information unit is provided to the user to determine relative location between the region and candidate information unit so that the number of the candidate information units covered by the target region is set to be two or more by the user according to desire. This will make the technical effect more intuitive.

In the step (3), for the selection information unit set, when the information elements owned by an information unit contain or are identical to the information elements owned by the predefined password, it is determined that the user has chosen correct information units of the predefined password. As a result, the password may be preset more simply. When the candidate information units are provided, each one may carry more information elements to generate sight disturbance and accordingly, multi-vocality expression of the units are enhanced.

In the step (1), each time each set of candidate information units is displayed, all the candidate information units of the set are randomly arranged and then displayed according to this sequence. By this means, when it is time to verify a string (set) of characters, the interface layout displayed each time will be varied slightly. This evidently increases difficulty of the stealer to remember the password and thus reduces possibility of password being noticed and cracked.

As a further implementation of the invention, the following methods may be employed to realize password verification:

At first, when the predefined password includes several information units, the method applies to each information unit regarding sequence; and when the user has chosen all correct information units, signal indicating the entire password has been successfully verified is output.

Secondly, the user is permitted to select multiple target regions in the step (2); when verification is performed in the step (3), each information unit of the selection information unit set selected by a respective target region is compared with a respective information unit of the predefined password; and when the information unit contained in the predefined password at a corresponding sequence location is also contained in the selection information unit set of a target region having a corresponding sequence location, it is determined that the user has chosen correct information unit at a corresponding location of the predefined password.

Thirdly, the user is permitted to select multiple target regions in the step (2); when verification is performed in the step (3), the selection information unit sets selected by each target region are compared with all the information unit of the predefined password; and when the information unit contained in the predefined password at a corresponding sequence location is also contained in the selection information unit set of a target region having a corresponding sequence location, it is determined that the user has chosen correct information unit at a corresponding location of the predefined password.

All of above methods may realize verification of multiple-digit password. To further improve security, the number of the candidate information units selected each time may be increased. In other words, each time the present method runs, the selection information set is determined only after the target selection region covers the specified number of candidate information units.

A password verifying device for performing the multi-vocal password verifying method described above includes a storage unit for storing program used for implementing the method, a control unit for executing the program, and a display screen for displaying a graphical user interface of the method.

The present invention brings following good effects when compared with prior art technology.

Firstly, human-machine interaction experience is greatly enhanced by permitting determination of the target selection region on demand. There may be kinds of interaction manners. For example, the candidate information unit may come into the target selection region so as to construct a selection information unit set. Alternatively, the target selection region may run to set several candidate information units as a selection information unit set. In addition, the selection information unit set may also be determined during movement of the target selection region and candidate information units. Interaction is various and there is wide room for design improvement. By this manner, a password verifying means completely different from prior art, easy to build and use is provided.

Secondly, as two or more candidate information units are covered by each selection information unit, in course of determining number of the selected candidate information units by the user on demand, process of selection of correct information units is changing. Furthermore, multiple selected candidate information units further increase vagueness of password verification. Further, as the candidate information unit and information units contained in the predefined password may also be consisted of kinds of information elements, vagueness of password verification is also enhanced. During input of entire password by the user, the password will not be easily noticed or remembered. Therefore, password input is safe.

By the same token, as for a selection information unit set, two or more information units are included, and each information unit may contain two or more information elements, cracking efficiency of the stealer by analysis of data intercepted during many times of password input by the user is still dramatically decreased due to complexity and identification difficulty of the various information elements being increased. Accordingly, safety of password verification is improved.

Finally, in present invention, selection of candidate information unit may be realized by accepting selection instructions of the user via kinds of known input means. For example, device such as infra-red sensor, vibration sensor, camera head, touch screen, physical button, or microphone may be used to transform actions of the user into selection instructions. Similarly, conclusion may be drawn that the present invention has extensive application and will have deep influence on security technology of the electronic devices.

DETAILED DESCRIPTION OF THE INVENTION

Figure 1:
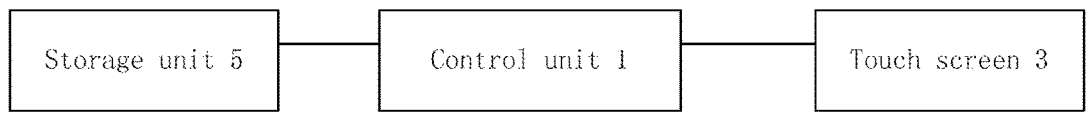
FIG. 1 shows a schematic electric diagram of a password verifying device for performing a multi-vocal password verifying method of the invention.

Various embodiments of the invention are described below in greater details. The examples of these embodiments are illustrated in figure drawings. Throughout the drawings same or similar numerals are used to refer to same or similar elements or those having same or similar function. The description of the embodiments in conjunction with drawings is only exemplary for explaining principle of the invention and is not to be interpreted to limit the invention.

It should be understood by person of the ordinary skill in the art that unless otherwise specified, terms "a", "one", "the" and "said" in singular form may also be used in plural form. It should be further understood that the term "include" as used herein means presence of said feature, integer, step, operation, element and/or component, but not excluding presence of one or more additional other feature, integer, step, operation, element and/or component and/or their combination. The term "and/or" includes one or more related elements and all combination thereof.

It should be understood by person of the ordinary skill in the art that unless otherwise specified, all the terminology (including technical and scientific terms) have their ordinary meaning as understood by person of the art.

It should also be understood by person of the ordinary skill in the art that the device, terminal, or terminal device of the invention may include device of a wireless signal receiver capable of only receiving signal while not be able to transmitting signals. It may also include device capable of receiving and transmitting signals. Examples include cellular device or other communication device, cellular device or other communication device with single line or multiple-line display or without multiple-line display, PCS (Personal Communications Service with the ability of processing voice, data, fax and/or data communication; PDA (Personal Digital Assistant) including radio frequency receiver, pager, internet/intranet access, network explorer, notepad, calendar and/or GPS (Global Positioning System) receiver; And normal alp-top and/or palmtop computer or other device including radio frequency receiver. The terminal and terminal device may be portable, transportable, or installable to vehicle (aviation, shipping and/or land), or is configured to be operated in local position, and/or distributed location, or be operated on earth and/or any other location on space. The device, terminal and terminal device may also include communication terminal, internet access terminal, music/video play terminal such as PDA and/or mobile phone, or smart TV, top box and the like.

It should also be understood that the verifying device of the invention includes any electronic device where safe password verification is required. This verification device may be realized by combination of software and hardware based on above device, terminal or terminal device. The verification device also includes ATM, automobile safety gate system, door phone system, lock and the like. It may also be device for independently finishing password verification process and then outputting signal indicating password verification is ok. It should be known that though the invention is described in context of various modern terminal devices, the invention is by no means limited to these terminal devices. Rather, any device with a display screen and implemented by smart operating system may be used to practice the invention method and forms the device mentioned in the specification.

The storage, storage unit or storage device as occurred in the invention is used for storing the password and functions as the source of the password. The storage space is not limited to a local terminal machine, but may also come from remote server, for example getting access through local area network or internet. Correspondingly, the verification process may be conducted in a local terminal machine to obtain the verification result. Or, related information may be transmitted to a remote server to get the verification result and then return the result to the terminal machine. Person of the art should understand this variation.

"Multi-vocal" as used in the invention means there is no definite and sole result when matter is considered visually. In this invention, by selecting at same time several candidate information units, definiteness is avoided, thus realizing fuzzy expression of the selected content. Therefore, "multi-vocal password verifying" as used herein means during password verification, fuzzy expression effect of user selected content is obtained by selecting several candidate information units at one time. This fuzzy expression effect may be understood in terms of visualization or data analysis. However, for intelligent system program to perform the invention, this multi-vocal selection will not have influence on operation of the program. Operation of the program will still get the definite result.

The "information unit" as used herein has its ordinary meaning of a unit composed of at least one information element. The information element may include any one or combination of character, color, font, font size, image, pattern or even sound wave. An information unit may be constructed of a character to get visual expression. It may also be the combination of character and color to also get the visual expression. Alternatively, it may be the combination of pattern and color. It is known from above explanation that the information unit may not be limited to any one or combination of character, color, font, font size, image, and pattern. The character has ordinary and customary meaning and may include but not limited to Chinese characters, English characters, Arab numbers, Roman numbers and the like. Publicly, information may be expressed by kinds of manners. Each kind of information should be expressed by some manner. The information may be sorted into visual information and non-visual information. The information unit and candidate information unit as described in present invention are preferably visual expression information. They may also be non-visual information.

Unless otherwise specified, the terms "password" or "predefined password" as used throughout the specification means the password preset by the user and it generally is composed of several information units arranged according certain sequence, for example a string of characters or characters with color and it normally is stored implicitly. As such, the term "verifying or verification" occurred herein is not necessarily only pointed to direct comparison of contents corresponding to the password, expressed according to certain manner and stored, with the contents selected by the user. It may also mean comparison of the password after transformation with the contents selected by the user. In other words, the correct information unit may have kinds of forms such as explicit expression, implicit expression and other intermediate expression. The inventor of the invention believes that person of the art would understand the true meaning of above concepts.

The implementation of the invention will be explained below with reference to various embodiments.

First Embodiment

With reference to FIG. 1, a password verifying device of the invention includes a control unit 1, a storage unit 5 and a touch screen 3. The control unit 1 operates to control the entire device and mainly serves to perform a program obtained according to a password verifying method of the invention so as to perform password verification process. The storage unit 5 functions to permanently or temporarily store various intermediate data generated during operation of the program obtained according to a password verifying method of the invention. The intermediate date may include for example user's predefined password, part or full of candidate information units and selection information units to be formed subsequently. The storage unit 5 may also store predefined labels such as image, voice and status which may be involved during storage program. Person of the art should be noted that the predefined password of the present method and device should be permanently stored (excerpt that the user changes it when performing a reset process). Regarding other data used in the method of the invention, it is determined flexibly by the program whether this data should be stored in the storage unit. Therefore, use of the storage unit in the invention should not be understood as having limitation to the storage technology used in this invention. Under the control of the control unit 1, the password verifying method of the invention realizes human-machine interaction by means of the touch screen 3. Optionally in other embodiments, human-machine interaction may also be realized by combination of normal display or touch screen with physical buttons, microphone, camera, infra-red sensor, vibration sensor or gyro, thereby realizing password verification operation of the invention.

To facilitate description of the invention, it is assumed that a certified equipment has already a predefined password constructed of a series of information units each of which only contains one kind of information element, i.e., character information element for example character string "1788".

The multi-vocal password verifying method of the invention may be implemented by programming of above device. Reference is made to the flowchart of FIG. 2 and a graphic user interface 80 shown in a display screen 3 of FIG. 3.

As a primary step of the password verifying method of the invention, the graphic user interface 80 clearly defines at its middle portion three annular display regions 81, 82 and 83 with their diameter decreased gradually in order. By this way, there are formed three concentric circles. Of course, radial distance among these annular display regions 81, 82 and 83 may be suitably increased to optimize their visual effects. Or, these annular display regions 81, 82 and 83 may be colored or have boundary edges to increase identification. The shape of these display regions may also be other endless shape such as arc, ellipse, rectangular, triangular and the like.

Each of these annular display regions 81, 82 and 83 corresponds to a set of candidate information units and, each set of said units is consisted of ten candidate information unit units including information elements "0-9". Said each candidate information unit may also be consisted of only one kind of information element, i.e., numerical characters while not including other kinds of elements including color, font, font size, pattern, image or the like. The number of the annular display regions is not limited by this embodiment and it may be more or less. However, in any case, the number should be at least two. More particularly, there should be at least two sets of candidate information units corresponding to the display regions. Otherwise, this will have little help to improvement of multi-vocal expression.

Figure 3:
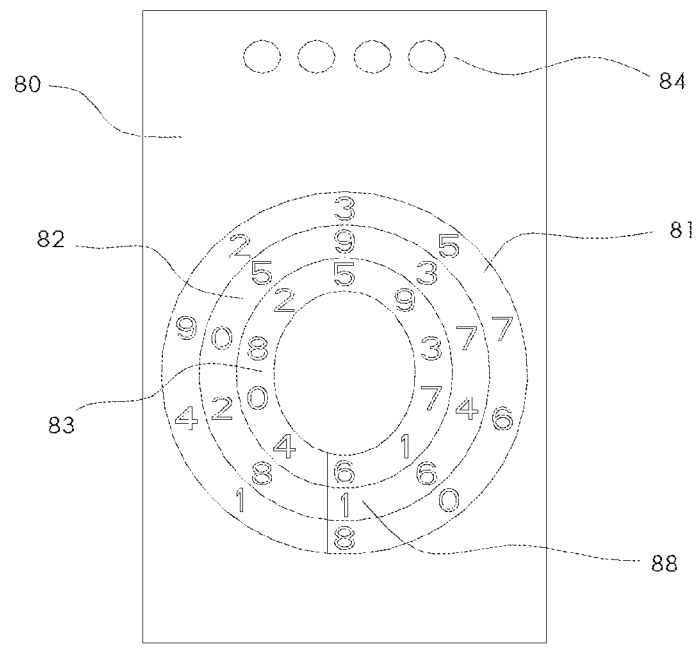
FIG. 3 shows a graphical user interface according to a first embodiment of a multi-vocal password verifying method of the invention, where only one target selection region is shown and a display region is shown as an annular.

The type of information element contained in each candidate information unit set may also be varied and is not limited to the numerical character of this embodiment. For instance, information element may be kinds of symbol characters. For verifying password, no matter what kind of information elements are contained in the candidate information unit of the candidate information unit set, the information units of the predefined password must be contained in at least one candidate information unit of the set and form part of full of the candidate information units. For example, to verify the password arranged at a first location, the correct information unit should be "1" and therefore, it is necessary to include "1" into at least one candidate information unit. As illustrated in FIG. 3 of the embodiment, all three candidate information units contain this character "1" and it is correspondingly shown in three annular display regions 81-83 but their locations are misaligned among each other.

According to known password setting principle, said set of candidate information units may include information units at all locations of the predefined password. Or, the information elements of these information units at all locations may form part of the corresponding candidate information unit of the corresponding set. Alternatively, other information elements different from those of the units of the predefined password may also be included in the corresponding candidate information unit.

To increase difficulty of password being illegally stolen or remembered, before displaying of contents of each set of candidate information units each time, these candidate information units to be displayed and contained in the set are randomly arranged so that they are out of order. Eventually, a set of candidate information units are randomly displayed in the corresponding display regions 81-83 of the interface 80. As such, it will be difficult for the stealer to remember the entire layout by analysis of arrangement of the candidate information units and therefore it greatly increases difficulty to crack the password, despite the user repeatedly inputs the same password character or entire password characters.

In the graphic user interface 90 of FIG. 3, the candidate information units displayed in these display regions 81-83 may be displayed as though they were rotating such that part or all of the candidate information units in the same display region are changing their locations in real time. Preferably, movement range of the candidate information units may be confined into all or specific part of the display regions 81-83. Alternatively, they may be shown statically so that all the candidate information units have fixed locations. Or, all the units of a specific set of candidate information units may be dynamically displayed in their corresponding display region, while other units in the rest display regions may have fixed locations. In case that all the units are dynamically displayed in each of display regions 81-83, each annular display region may rotate about a center with different speed and/or rotation direction. As a result, at any time, the contents of the three annular display regions 81-83 along any radial direction are always changing. This will make it difficult for the stealer to accurately discern the candidate information units distributed on the same radial direction and belonging to different set of candidate information units. This makes it hard for the stealer to remember the password. Evidently, there may be other manners in which the annular display regions 81-83 are dynamically displayed. Person of the art should note that the eccentric rotation or randomly floating of the annular display regions is also possible. No matter what kind of movement is employed, person of the art should understand after reading of the invention that combination of these sets of candidate information units may be realized by any publicly known animation.

Figure 2:
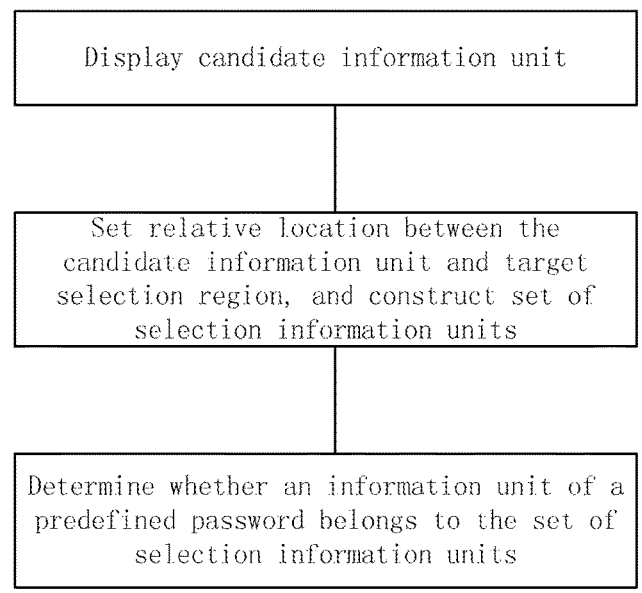
FIG. 2 shows a flowchart of a multi-vocal password verifying method of the invention.

Referring to FIGS. 2 and 3 together, as a second step of the multi-vocal password verifying method of the invention, it is required that the user make fuzzy selection of target candidate information unit coverage. That is to realize multi-vocal expression of content selected by the user. In theory realization of this fuzzy selection may be done by driving a target selection region 88 or said candidate information units or the both. The user can change on demand relative location between the target selection region 88 and candidate information units (sets) on the graphic user interface 80, so as to set the relative location between the two and accordingly, to make sure that the quantity of the candidate information units covered by the target selection region 88 is at least two. The above setting of relative location can be done by designating display location of the target selection region 88 by the user, or changing a previous location of the same, or changing location of the candidate information units. It should not be interpreted that this can be done only by changing location of the target selection region 88 or candidate information units.

In this embodiment, the user can select coverage of the target selection region 88 by various manners. However, the relative location of the target selection region 88 and candidate information units may be designated by the user desirably. Concretely, the user can finally determine the number of the units covered by the target selection region 88.

These covered target selection region 88 are those that locate in a visual plane of the graphic user interface and fall within the boundary of the target selection region 88 and/or cross the boundary no matter whether these units belong to the same or different set. The boundary of the target selection region 88 as used herein includes not only a visual solid boundary defined by an outer contour of the target selection region 88 generated by drawing, but also a virtual boundary which is not shown visually but has physical border designated by a program. It may also include a clear boundary having specific coordinates in the graphic user interface 80 or a final boundary defined by extension or contraction from the clear boundary. To get multi-vocal expression effect of the invention, it should be understood that when selecting the candidate information units, the number of them can be designated (covered) by the program in default. The number may also be determined by the user according to requirement. However, only when the target selection region 88 covers at least two said candidate information units, requirement for selection of said target selection region meets, thus realizing selection of the target selection region 88. The following are some methods for realization of selection by setting relative location between the target selection region 88 and candidate information units.

(A) Selection method in case of movement of both target selection region 88 and candidate information units. In this selection method, the following steps are included:

(1) Draw a visual target selection region 88 and displaying the same on a graphic user interface 80. For example, in FIG. 3, the target selection region 88 shown in the graphic user interface 80 is substantially of a rectangular region which is extended radially through three annular display regions 81-83. It may also take on ellipse. Coordinates of contour of the shape constitute the boundary of the target selection region 88. In addition, the target selection region 88 automatically rotates around a center clockwise or counterclockwise with certain speed. Care should be taken that plotting of the target selection region 88 is by no means limited to line expression of FIG. 3. It may also be implemented by color block masking, layer masking, color change of candidate information units or the like.

(2) Rotate the candidate information units of the three annular display regions 81-83 while keeping rotation of the target selection region 88. However, three annular display regions 81-83 have different rotation speed from the target selection region 88. Furthermore, it is also possible for three annular display regions 81-83 to have different rotation speed and direction. It is noticed that in setting of keeping movement of the target selection region 88 and candidate information units, it should be followed that the different candidate information unit combination should be shown in the target selection region 88 at different time by setting different rotation speed and direction.

Note that the above steps (1) and (2) are not necessarily performed in sequence as listed above. Indeed, they can be performed concurrently.

(3) Wait for instructions from the user to realize final selection. More particularly, the user can trigger a user instruction after the target selection region 88 has covered the candidate information units needed by the user, thus realizing location limitation of the target selection region 88 by the user. That is, the relative location between the target selection region 88 and respective candidate information unit is eventually determined, hence realizing determination of the specific contents and quantity of the candidate information units covered by the target selection region 88. For touch screen 3, the user can click or select a region or specific region on the screen 3 to trigger an instruction. When the user presses the screen, the user instruction is triggered. This may also be done by other means. For example, user instruction (command) may be activated by capturing via a camera a specific user gesture or predefined visual motion, by detecting through a gyro a particular operation of the user terminal in horizontal level, by identifying a specific voice instruction through a microphone, by detecting shaking of the user terminal through a vibration sensor, by detection of a specific gesture of the user through an infra-red sensor, by detection of conducting state of one or more physical buttons and the like. These devices, including touch screen, camera, gyro, microphone, vibration sensor, infra-red sensor and physical buttons form inputting sources of the user instructions. These inputting sources (not shown) provide user instructions to make selection of the target selection region 88. One set of selection information units is defined by the candidate information units covered by the target selection region 88 once the location of the region 88 is determined by the user. It is noted that the set of selection information units as used herein means data collection of the selected candidate information units. These units of course may be combined according to mathematical aggregation but not solely being limited to this manner. It falls within the scope of the invention no matter what kind of computer data structure aggregation is used.

(B) Selection method in case of the candidate information units kept stationary while the target selection region 88 moving. This selection method includes the following steps.

(1) Similar to the first selection method as described above, a target selection region 88 is drawn. By the same token, this region 88 may be suitably of a rectangular extended radially. Preferably the region extends through three display regions where the candidate information units locate so as to cover said three units. The target selection region 88 as mentioned here operates in the same manner as the first selection method.

(2) Different from the first selection method, in the second method, the set of candidate information units are kept stationary in the corresponding annular display region. When the target selection region 88 rotates, a clearer graphical user interface 80 is provided to the user as the candidate information units are kept unchanged regarding their location, thus the user being able to manipulate the screen with accuracy. This however will certainly reduce multi-vocal expression effects.

(3) Selection of the target selection region 88 is realized in a similar manner as discussed above in step (3) of the first method. In this case, the location of the region 88 may be determined by user instructions once the region 88 rotates such that it covers the desired candidate information units, thereby determining the set of selection information units.

(C) Selection methods in case of target selection region 88 stationary while the candidate information units moving.

Similar to the first method, this third method also includes three steps. However, in step (1) of the third method, the target selection region 88 thus generated has a fixed location in the graphical user interface. Step (2) is the same as that of the first selection method, and the candidate information units in the annular display regions 81-83 rotate. Accordingly, when the candidate information units inside the annular display regions 81-83 rotate to a status required by the user, the candidate information units wanted by the user come into the region 88. In this situation, the set of selection information units in current status may be confirmed if the user issues the user instructions.

(D) Selection method in case of target selection region 88 being moved. This method includes the following steps.

(1) Draw a target selection region 88 as described above and ensure that the region 88 will cover at least two candidate information units. Preferably, it is suitable for the region 88 to cover radially the annular display regions 81-83 so as to cover three candidate information units belonging to different display regions. An initial location is assigned to the target selection region 88, for example left bottom corner of the graphical user interface 80.

(2) Detect user gesture, operation of the touch screen, horizontal level control of a certified device and the like through kinds of input devices (function as input sources) such as camera, touch screen, gyro and so on. When the user begins to make above motions using said input source (not shown), the input source triggers a first user instruction thus driving the region 88 to move or to be moved by continuation of the user motion (for example continuous visual motion, finger sliding, or tilting the certified device). The movement of the region 88 continues until the user has chosen desired location of the target selection region 88 and then the user changes his motion.

(3) When the user changes his manual motions, for example in terms of the above input sources, the user blinks, moves his finger away, stops tilting certified device, the input source will trigger a second user instruction, thus the current location of the region 88 is designated. At this time, all the candidate information units covered by the target selection region 88 constitute the set of selection information units.

In this selection method there is no need to consider whether the candidate information units are moving or stationary.

(E) Selection method in case of dynamically generating the target selection region 88.

This method is easier to manual operate. Specifically, reference may be made to the first selection method such that the candidate information units inside the annular display regions 81-83 are displayed statically or dynamically. Accordingly, finger sliding of the user may realize selection of the target selection region 88. When the user makes selection of the desired candidate information units, he can slide his finger on several candidate information units and ensure the selection region range formed by finger sliding covers the desired candidate information units, no matter whether the annular display regions 81-83 and candidate information units contained therein move. However, it should be noted that a valid sliding selection exists only when the selection region generated by finger sliding covers at least two candidate information units as required by the program. By this manner, the target selection region 88 is defined. The first instruction is triggered when the user beings to slide his finger. Continue sliding of user finger and final departing from the screen signals release or completion of the user instruction, or triggering of a second event by the user. That is, a second user instruction is triggered. The difference between the first and second instructions may be made by the programmer with flexibility, and this difference has no influence on selection of the region 88 by the user. The selection region is formed by triggering of the first and second user instructions. It is well known that the selection region formed by sliding of user finger is not definitely accurate and may contain certain tolerance. Consequently, determination of the region 88 by user finger sliding and regarding the candidate information units falling within the region 88 as the set of selection information units, shares in essence the same principle underlying the aforementioned various selection methods and they still fall within the scope and spirit of the invention. It is noted that determination of the region 88 by finger sliding may be interpreted as many user instructions and therefore, there must be a final instruction (the second instruction) to designate the final location of the region 88. By this manner, the relative location between the target selection region 88 and candidate information units is set. Ideally more candidate information units will be covered if the range of user finger sliding is wider. In this case, if the program has restricted the maximum number of the candidate information units, then the candidate information units located in a beginning area of the region 88 may be considered as valid set of selection information units, while the rest candidate information units may be regarded as interfering factors, thus enhancing multi-vocal expression effect of the invention.

When performing said finger sliding, the target selection region may or may not occur visually on the screen. The former makes the candidate information units chosen by the user more intuitive thus enhancing interaction; while the latter makes the candidate information units more hidden hence enhancing safety.

Though in this method the region 88 is preferably generated dynamically by finger sliding on the touch screen 3, person of the art should understand that similar selecting of the region 88 may also be achieved by for example interpretation by a camera or infra-red sensor of floating gesture not imposed on the touch screen as a set of user instructions similar to those generated through finger sliding. Similarly, other alternative means such as visual motion or screen tilting may also realize selection method.

By now various methods of selecting the target selection region 88 have been described in above embodiments. Person of the art should note that according to the spirit reflected by examples of the invention and kinds of input sources thus disclosed and understanding of well known means in the art, numerous methods of selecting the target selection region 88 may be presented. No matter whether the region 88 is defined in advance by program plotting or designated by the user in real time during the verification process, all these means fall within the scope of the invention.

A third step of the multi-vocal password verifying method of the invention is important. In this embodiment, the set of selection information units has been obtained in previous two steps and therefore in the third step, the set of selection information units are further utilized. After the set of selection information units are obtained in this step, and information units of the predefined password to be verified are compared to the set of selection information units. When it is determined that the set of selection information units contain the information units to be verified, it is confirmed that the user has chosen correct information units of the predefined password. In other words, the user has correctly chosen contents same as the information units of the predefined password. In this case, verification is successful.

As described above, it is noted that if the predefined password is stored in the present terminal (device), then the predefined password stored in the memory should be retrieved to perform above verification. In case that the predefined password is located in a remote terminal, then the set of selection information units may be transmitted to this terminal to perform the verification and finally, the result of verification is returned by the remote terminal server.

In addition, as used in this embodiment, the candidate information units and information units of the predefined password are simplified to contain only single information element for easy description. Therefore, when the information units of the predefined password are compared to the set of selection information units, the information units of the predefined password may be thoroughly compared to the elements of the set of selection information units. However as mentioned above, the candidate information unit may include several information elements. For example, assume that the first digit of predefined password is "1". In three display regions 81-83 of FIG. 2, three characters "1" are expressed in red, green and blue respectively. In other words, the candidate information units in the display regions 81-83 indeed contain two kinds of information elements, one of which is character element, while the other is color element. The character element is combined with the color element. Of course, one of the two information elements may be pattern or image, while the other character. Pattern (image) may be of a square or circle. When the two information elements are visually expressed, the character may be surrounded by the pattern (image). The two information elements may also be card pattern such as heart, club, spade or shape of some article. When visually expressing the elements, one pattern may be close to the image. In predefined password as described above for simplicity, only a single character element is employed as the sole information element of the information units. Under this circumstance, the information element of the unit of the predefined password forms the entire information unit. When comparison is made between the information unit of the password and set of selection information units, the information (or information element) of the password should not be directly compared to elements of the set. Rather, the information (or information element) of the password should be compared with each information element of the set. In other words, the information (or information element) of the password should be compared to the elements themselves of the set. In this situation, as long as the information (or information element) of the password is identical to a specific unit of the set, i.e., the information (or information element) of the password should is included in this unit of the set, it is confirmed that the user has chosen correct information units of the predefined password.

This also applies to embodiments where the information unit of the predefined password contains at least two information elements. For example, it is assumed that the predefined password of a certified device contains several information units, and each information unit includes two kinds of information elements such as character element and color element for expression of the character color. They may e.g. include green character "1", red character "7", black character "8" and green character "8". In general, when performing password verification using the certified device, it is impossible to verify the password only by inputting a string of characters "1788" without color. Rather, each character with a particular color should be inputted in sequence. These characters with their specific color together form the entire correct information unit and only in this case, it is confirmed that the verification is ok. This is reflected in the third step of the invention. When making comparison, all information elements of the unit of the predefined password should be compared to all the elements of the information unit of the set. It is confirmed that the user has input correct information unit of the predefined password only if each information element of the unit of the password belongs to or identical to a corresponding information element of the information unit of the set.

To further enhance fuzzy effect, in a variation of the above embodiment where the candidate information unit contains plural information elements, two or more candidate information units may be selected from a same set of candidate information units; or one or more units may be selected from different sets of candidate information units; and these selected units may be configured to have at least one identical information element. Take character "1" of the predefined password "1788" including only one kind of element in the unit as an example. The three characters "1" as shown in FIG. 3 may be displayed in red, green or blue respectively. Alternatively, some discrete characters located in the outmost annular of FIG. 3 may have the same color. As such, the stealer should notice not only the difference among the characters, but also difference in color. This to some extent will cause confusion to the stealer. Apparently, when this variation embodiment is combined with another embodiment where the information unit of the predefined password contains at least two information elements, multi-vocal expression effect is further enhanced. More specifically, it is assumed that the predefined password contains information unit of red character "1", and the display region located on the outmost annular of FIG. 3 contains two characters "1" in red and green respectively. In this case, the stealer must remember both the number "1" selected by the user and its color and accordingly, this will increase difficulty of the person to strongly remember the password.

Evidently, by configuring the candidate information unit to have at least two information elements, multi-vocal expression of the candidate information unit is further enhanced. Alternatively speaking, fuzzy of content selected by the user becomes enhanced and as a result, it will be hard for a stealer to crack down the password by strongly remembering or analysis of user motions. Even the stealer employs data stream interception, as the same set of selection information units contains several candidate information units selected by the user, and the selected unit also contains several information elements, cracking by this means still face great challenge. Therefore, inclusion of several elements in a candidate information unit is more suitable for remote password verification, for example Wi-Fi password verification, webpage password verification or the like.

In a typical embodiment of the multi-vocal password verifying method as described above, the candidate information units with fixed location is considered in addition to the case where the candidate information units are dynamically displayed in the display regions 81-83. It is noted that dynamical display of the candidate information units means the candidate information units are grouped and confined in the regions 81-83 respectively. Therefore, movement of the candidate information units is highly limited. A further embodiment will discuss a solution in which dynamic display with higher flexibility will be presented.

In a typical embodiment of the multi-vocal password verifying method as described above, regarding shape of the display regions 81-83 of the candidate information units of the graphical user interface 80 and movement manner of the candidate information units, the regions 81-83 are designed to have annular shape, and the candidate information units are designed to rotate around the display regions. Of course, this rotation in fact is rolling movement circularly. However, in a variation of this embodiment and referring to FIG. 4, the display regions 81-83 are not annular but rectangular (shown with solid lines or hidden completely) for example bar shape. These bar-shaped display regions 81-83 are parallel to each other. Next, the candidate information units of the set are designed to repeatedly move along a longitudinal direction (wide direction of the figure), and this will also achieve the objects of the invention. It is noted that movement of the target selection region 88 should also be adaptively adjusted. Specifically, the region 88 may mutually move or circularly move along the longitudinal direction of the rectangular display regions 81-83. In other words, corresponding to the layout change of the regions 81-83 in this embodiment, the movement manner of the region 88 should also be changed. It is understood that other movement manner may also be possible for the region 88.

A typical embodiment of the multi-vocal password verifying method of the invention has been illustrated above in details. The above verifying method is discussed in terms of specific digit of information unit of the predefined password. Below various verification methods of multi-digit password are listed to further understand the verification process of the same having several information units. Understandingly, these verification methods of multi-digit password apply not only to aforementioned embodiments, but also to embodiments to be discussed below. Disclosure of verification methods of multi-digit password is to further explain application and advantageous effects of the same.

According to a first verification method of multi-digit password, each information unit of the predefined password may be verified in sequence based on the multi-vocal password verifying method of the invention. When the user select all the correct information units, message on predefined password verification successful is output as a result and is provided to subsequent programs for use including program for performing unlock action, program for performing subsequent operations and the like. This manner is comparatively traditional and is widely employed. A typical use of it can be found in screen unlock of the mobile terminal, password verification of ATM and webpage password verification process. This will be understood by person of the art and therefore no further description is provided.

Figure 5:
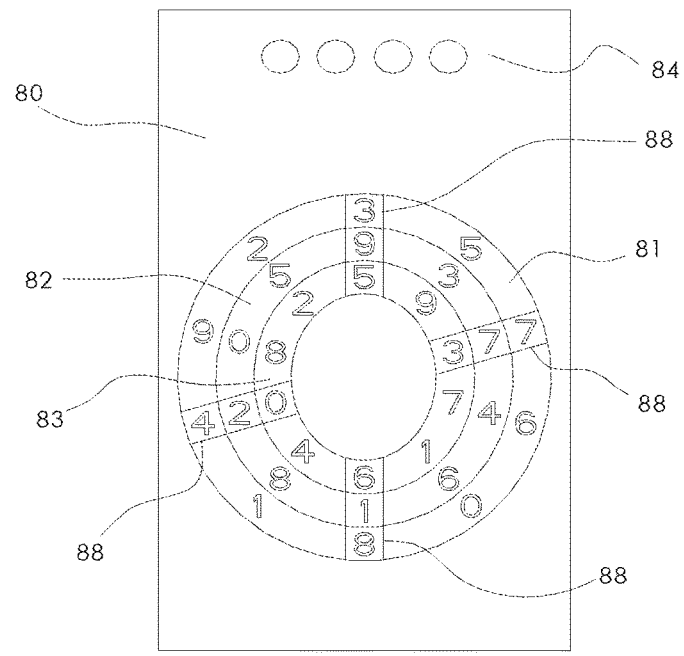
FIG. 5 shows a graphical user interface according to a first embodiment of a multi-vocal password verifying method of the invention, where plural target selection regions are shown.

According to a second verification method of multi-digit password and with reference to FIG. 5 which shows a graphical user interface having four target selection regions 88, choosing of these regions 88 may be done in a manner similar to the fifth target selection region 88 as discussed in previous embodiment. In particular, when performing the second step of the multi-vocal password verifying method of the invention, corresponding to the several information units, the user is permitted to select at a time all the regions 88 in a manner similar to the fifth target selection region 88. When performing the third step of the multi-vocal password verifying method of the invention, according to the location sequence of the information units contained in the predefined password, the selection information units constructed by respective target selection region 88 may be compared to information units at corresponding location of the predefined password. When information units at corresponding location of the predefined password can be found in corresponding location of the specific target selection region 88, it is determined that the user has chosen correct information units of the password. In other words, when all the information units of the predefined password can be found in the set of the selection information units of the region 88, verification of the entire string of password is ok and subsequently, signals indicating successful verification of the entire string of password may be output for subsequent operation.

A third verification method of multi-digit password is improved upon the second method and there are some differences between the two methods. In the second verification method of multi-digit password, it is emphasized that comparison is made one by one between the information units of the predefined password according to their arrangement order and set of the selection information units corresponding to the region 88. By contrast, in the third verification method of multi-digit password, there is no need to consider the arrange order; rather when the set of selection information units of any one target selection region 88 include any one of information units of the predefined password, conclusion can be drawn that the set of selection information units have included the correct information unit of a specific location of the predefined password. This method reduces difficulty to crack the password and therefore has low safety. However, this method has lower hardware requirement. Accordingly, this method applies to password verification implemented by single-chip.

Figure 4:
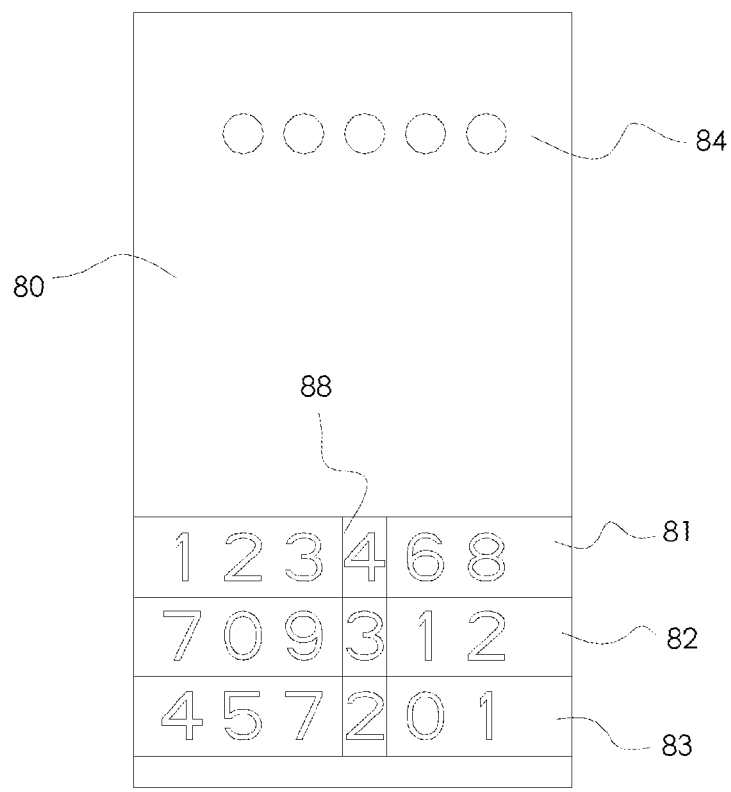
FIG. 4 shows a graphical user interface according to a first embodiment of a multi-vocal password verifying method of the invention, where the display region is different from FIG. 3 and is of a rectangular.

Some circles 84 are shown above respective graphical user interfaces 80 of FIGS. 3-5 for indicating verification status of information units of a predefined password. This circle design is well known in the art and therefore no further description is provided.

In above kinds of verification method of multi-digit password, to increase complexity, the number of the candidate information units covered by the target selection region 88 prior to verification of each information unit may be prescribed and make sure that the number is equal for all information units. In this case, for each information unit of the predefined password, there is a corresponding set of selection information units having a fixed number of elements. This necessarily increases computing complexity, and it is harder for the stealer to crack down the password by peeping or strong remembering.

Second Embodiment

To be simple, the multi-vocal password verifying method of this embodiment is still described with reference to hardware shown in FIG. 1 and flowchart of FIG. 2. Person of the art should know that this by no means imposes limitation to the hardware as described in the specification. Similarly, examples are taken where the predefined password is composed of information units for example characters "1788".

Figure 6:
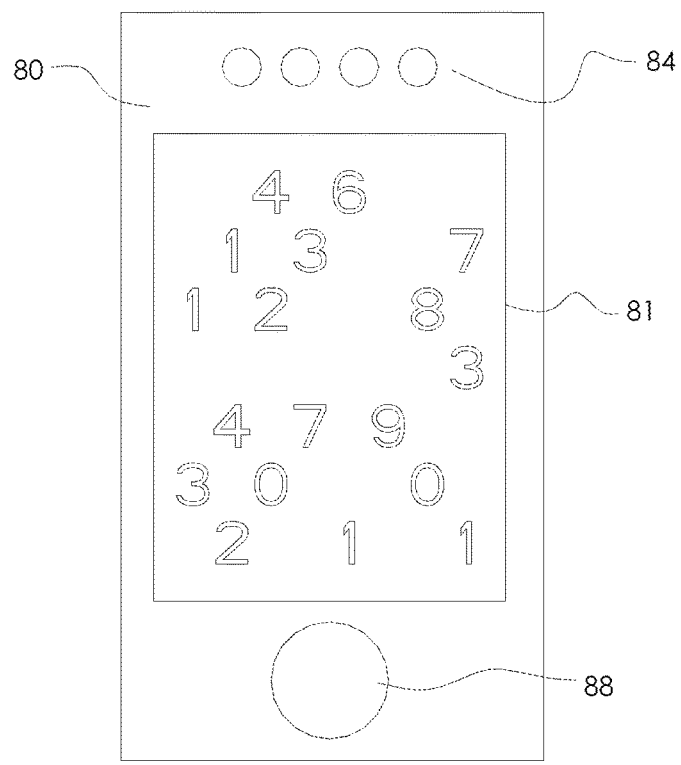
FIG. 6 shows a graphical user interface according to a second embodiment of a multi-vocal password verifying method of the invention, where a target selection region with changeable location and a display region are shown.

Please refer to the flowchart of FIG. 2 and graphical user interface 80 of FIG. 6. Description of the embodiment will be conducted with reference to the interface 80.

In FIG. 6 of this embodiment, as a first step of multi-vocal password verifying method of the invention, the graphical user interface 80 includes a specific display region 81 into which a set of candidate information units occurs. Of course, there may be more sets of candidate information units existing in the region 81. The quantity of the sets only has influence on complexity of program design and can be designated freely without effecting substance of the invention. To describe simply, these candidate information units presented in the display screen 3 may be regarded as a separate set of candidate information units. The display region 81 may in theory be located at any place of the screen 3. For example, it may be the entire screen, or it may include no boundary. Of course, as shown in FIG. 6, the region 81 may also have rectangular or any other shape of boundary.

As mentioned above, the display region 81 is corresponding to the set of candidate information units and all the information units of the set are discretely displayed in this region 81. The set of candidate information units may include several information elements such as character element and color element. Description is made under assumption that the each set of units only contains character elements. The information elements of each set may include numbers 0-9. Though the predefined password only contains three information elements "1", "7", and "8", all the candidate information units may also include elements such as "0", "2" and the like, thus improving fuzzy expression effect.

Similar to the first embodiment, the contents of the information elements contained in the set of candidate information units may be varied freely and is not limited to the character element of this embodiment. For example, digit information elements of the candidate information units may further include signs, letters, images and the like. Type of information elements of the candidate information units is not limited to the characters, but may also be color, font, font size, pattern, or images. For verifying password, no matter what kind of information elements are contained in the candidate information unit of the candidate information unit set, the information units of the predefined password must be contained in at least one candidate information unit of the set and form part of full of the candidate information units. For example, to verify the password arranged at a first location, the correct information unit should be "1" and therefore, it is necessary to include "1" into at least one candidate information unit. As illustrated in FIG. 6 of the embodiment, there are four characters "1" shown in the display region 81 of the graphical user interface 80 but with their location misaligned. When the first location of the predefined password only contains the character information element "1", any candidate information unit containing the character "1" should be the correct information unit of the first location of the above password. Even in case that these candidate information units also contain color information elements such that the four characters "1" are displayed in red, green, blue and yellow respectively, and any one of these units is chosen, the chosen unit is still the correct information unit of the first location of the above password, as this chosen unit also contains character "1". In case that the first location of the predefined password contains the character information element "1" in red, only when a character "1" in red is selected, its corresponding candidate information unit is regarded as the correct information unit of the first location of the above password.

According to known password setting principle, said set of candidate information units may include information units at all locations of the predefined password. Or, the information elements of these information units at all locations may form part of the corresponding candidate information unit of the corresponding set. Alternatively, other information elements different from those of the units of the predefined password may also be included in the corresponding candidate information unit. In the display screen, there may be multiple sets of candidate information units containing the same information elements for on one hand increasing difficulty to crack the password and on the other hand facilitating password verification of legal user.

As discussed above, To increase difficulty of password being illegally stolen or remembered, before displaying of contents of each set of candidate information units each time, these candidate information units to be displayed and contained in the set are randomly arranged so that they are out of order. Eventually, a set of candidate information units are randomly displayed in the corresponding display region 81 of the interface 80. As such, it will be difficult for the stealer to remember the entire layout by analysis of arrangement of the candidate information units and therefore it greatly increases difficulty to crack the password, despite the user repeatedly inputs the same password character or entire password characters.

In the graphical user interface 80 especially the display region 81 of FIG. 6, some or all the candidate information units move in real time. Each candidate information unit may move according to certain formula representing a specific movement pattern or move randomly. Alternatively, each candidate information unit may also be displayed with fixed location to ensure that the display location of it will not be changed. The size of the display region 81 may be set based on display size of the information element of the candidate information unit and number of the candidate information units to ensure that these candidate information units will not be crowed in the same area or unduly be dispersed. By designing the candidate information units to move randomly with certain speed in the display region 81, it will be hard for the stealer to remember at a time all contents of the candidate information units located in one area, thus improving difficulty to crack the password. Interaction among these candidate information units may be realized by animation and this should be understood by person of the art after reading the present invention.

Referring to FIGS. 2 and 3 together, as a second step of the multi-vocal password verifying method of the invention, it is required that the user make fuzzy selection of target candidate information unit coverage. That is to realize multi-vocal expression of content selected by the user. In theory realization of this fuzzy selection may be done by driving a target selection region 88 or said candidate information units. The user can change on demand relative location between the target selection region 88 and candidate information units on the graphic user interface 80, so as to set the relative location between the two and accordingly, to make sure that the quantity of the candidate information units covered by the target selection region 88 is at least two. The above setting of relative location can be done by designating display location of the target selection region 88 by the user, or changing a previous location of the same, or changing location of the candidate information units. It should not be interpreted that this can be done only by changing location of the target selection region 88 or candidate information units.

In this embodiment, the user can select coverage of the target selection region 88 by various manners. However, the relative location of the target selection region 88 and candidate information units may be designated by the user desirably. Concretely, the user can finally determine the number of the units covered by the target selection region 88.

These covered target selection region 88 are those that locate in a visual plane of the graphic user interface and fall within the boundary of the target selection region 88 and/or cross the boundary no matter whether these units belong to the same or different set. The boundary of the target selection region 88 as used herein includes not only a visual solid boundary defined by an outer contour of the target selection region 88 generated by drawing, but also a virtual boundary which is not shown visually but has physical border designated by a program. It may also include a clear boundary having specific coordinates in the graphic user interface 80 or a final boundary defined by extension or contraction from the clear boundary. To get multi-vocal expression effect of the invention, it should be understood that when selecting the candidate information units, the number of them can be designated (covered) by the program in default. The number may also be determined by the user according to requirement. However, only when the target selection region 88 covers at least two said candidate information units, requirement for selection of said target selection region meets, thus realizing selection of the target selection region 88. The following are some methods for realization of selection by setting relative location between the target selection region 88 and candidate information units.

(A) Selection method in case of movement of both target selection region 88 and candidate information units. In this selection method, the following steps are included:

(1) Draw a visual target selection region 88 and displaying the same on a graphic user interface 80. For example, in FIG. 5, the target selection region 88 shown in the graphic user interface 80 is substantially of a circle which is extended radially through at least three candidate information units shown in the screen. It may also take on ellipse, square, polygon and the like. Coordinates of contour of the shape constitute the boundary of the target selection region 88. In addition, when a specific information unit of the predefined password is verified, the target selection region 88 will change its location and/or orientation with fixed or varied speed to bring floating effect on the interface 80. Care should be taken that plotting of the target selection region 88 is by no means limited to line expression of FIG. 6. It may also be implemented by color block masking, layer masking, color change of candidate information units or the like.

(2) The candidate information units in the display region 81 also perform floating movement similar to the region 88 while the target selection region 88 is floating. The floating movement speed of the units may be designated so that the operator is able to clearly notice the candidate information units and know the same units have entered into the region 88. By this manner, the operator can finally make his selection instructions. It is known from the steps (1) and (2) that during floating process of the region 88 and candidate information units, the region 88 will certainly cover at least one unit. However, as it is required by the present solution that there must be at least two units coming into the region 88 to meet selection requirement, the program may be designed such that at least two candidate information units are always adjacent to each other. This adjacency means that the physical distance between these units is no longer than a certain predefined value. For example, assume the diameter of the circle target selection region 88 is R. If it is required that the largest distance between any two adjacent candidate information units be no longer than R/3, then when the region 88 comes into a central portion of the display region, it will easily cover three units. Similar examples may be contemplated by person of the art. It is therefore understandable that a default maximum value may be assigned to the graphical user interface 80 of the invention and the value may be the ratio between the longest longitudinal dimension of the target selection region and number of the candidate information units to be selected. In theory, this default maximum value may even be the largest display size of the graphical user interface, for example, the diagonal size of the screen and this may be set flexibly. In practice, the above example may be referenced to determine the relationship between the maximum size of the target selection region and distance between two adjacent units. The default value may either be variation that takes part in computing process or be realized by person of the art according to the idea of the invention. In other embodiments, if the target selection region is moved to some location and stays there for 0.5 second or longer (shorter), then the candidate information unit may be set to automatically move or jump into this target selection region. Apparently this may replace setting of the default maximum value and, this should be known by person of the art.

Note that the above steps (1) and (2) are not necessarily performed in sequence as listed above. Indeed, they can be performed concurrently.

(3) Wait for instructions from the user to realize final selection. More particularly, the user can trigger a user instruction after the target selection region 88 has covered the candidate information units needed by the user, thus realizing location limitation of the target selection region 88 by the user. That is, the relative location between the target selection region 88 and respective candidate information unit is eventually determined, hence realizing determination of the specific contents and quantity of the candidate information units covered by the target selection region 88. For touch screen 3, the user can click or select a region or specific region on the screen 3 to trigger an instruction. When the user presses the screen, the user instruction is triggered. This may also be done by other means. For example, user instruction (command) may be activated by capturing via a camera a specific user gesture or predefined visual motion, by detecting through a gyro a particular operation of the user terminal in horizontal level, by identifying a specific voice instruction through a microphone, by detecting shaking of the user terminal through a vibration sensor, by detection of a specific gesture of the user through an infra-red sensor, by detection of conducting state of one or more physical buttons and the like. These devices, including touch screen, camera, gyro, microphone, vibration sensor, infra-red sensor and physical buttons form inputting sources of the user instructions. These inputting sources (not shown) provide user instructions to make selection of the target selection region 88. One set of selection information units is defined by the candidate information units covered by the target selection region 88 once the location of the region 88 is determined by the user. It is noted that the set of selection information units as used herein means data collection of the selected candidate information units. These units of course may be combined according to mathematical aggregation but not solely being limited to this manner. It falls within the scope of the invention no matter what kind of computer data structure aggregation is used.

(B) Selection method in case of the candidate information units kept stationary while the target selection region 88 moving. This selection method includes the following steps.

(1) Similar to the first selection method as described above, a target selection region 88 is drawn. This region 88 is set to float in the screen.

(2) Different from the first selection method, in the second method, the candidate information units are kept stationary in the corresponding display region 81. When the target selection region 88 floats, a clearer graphical user interface 80 is provided to the user as the candidate information units are kept unchanged regarding their location, thus the user being able to manipulate the screen with accuracy. This however will certainly reduce multi-vocal expression effects. Same to the aforementioned solution in which the candidate information units float, relationship between the size of the region 88 and distance between two adjacent units to make sure that the region 88 will cover at least two units after coming into the region 81.

(3) Selection of the target selection region 88 is realized in a similar manner as discussed above in the first selection method. In this case, the location of the region 88 may be determined by user instructions once the region 88 floats such that it covers the desired candidate information units, thereby determining the set of selection information units. Determine the location relation between the region 88 and at least partial candidate information units so as to determine the set of selection information units (C) Selection methods in case of target selection region 88 stationary while the candidate information units moving.

Figure 7:
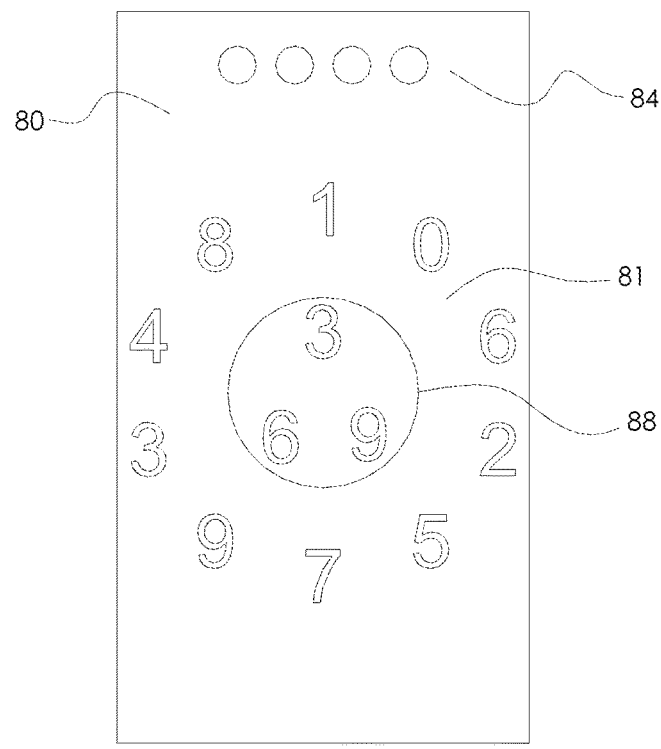
FIG. 7 shows a graphical user interface according to a second embodiment of a multi-vocal password verifying method of the invention, where a target selection region with fixed location and a display region are shown.

Referring to FIG. 7 showing a graphical user interface 80, layout of the region 88 and candidate information units is shown in the interface 80. The present invention operates in the layout. Similar to the first method, this third method also includes three steps. However, in step (1) of the third method, the target selection region 88 thus generated has a fixed location in the graphical user interface. As shown in FIG. 7, the target selection region 88 locates in the middle position of the screen. Step (2) is the same as that of the first selection method, and the candidate information units move. Accordingly, when the candidate information units float to the region 88, the candidate information units wanted by the user come into the region 88. In this situation, the set of selection information units in current status may be confirmed if the user issues the user instructions.

(D) Selection method in case of target selection region 88 being moved. This method includes the following steps.

(1) Draw a target selection region 88 as described above and ensure that the region 88 will cover at least two candidate information units. An initial location is assigned to the target selection region 88, for example bottom of the graphical user interface 80.

(2) Detect user gesture, operation of the touch screen, horizontal level control of a certified device and the like through kinds of input devices (function as input sources) such as camera, touch screen, gyro and so on. When the user begins to make above motions using said input source (not shown), the input source triggers a first user instruction thus driving the region 88 to move or to be moved by continuation of the user motion (for example continuous visual motion, finger sliding, or tilting the certified device). The movement of the region 88 continues until the user has chosen desired location of the target selection region 88 and then the user changes his motion.

(3) When the user changes his manual motions, for example in terms of the above input sources, the user blinks, moves his finger away, stops tilting certified device, the input source will trigger a second user instruction, thus the current location of the region 88 is designated. At this time, all the candidate information units covered by the target selection region 88 constitute the set of selection information units.

In this selection method there is no need to consider whether the candidate information units are moving or stationary.

(E) Selection method in case of the candidate information units being moved. In this method, the following steps are included.

As an alternative, in the selection method introduced in this embodiment where the target selection region 88 is provided in advance but is not generated dynamically, no matter whether the location of the candidate information units is fixed, no matter whether the region 88 moves, driving of the region 88 as mentioned in the fourth selection method may be employed in the step (3). In other words, the first user instruction may be accepted and driven by the same instruction, several candidate information units may be dragged into the region 88. As such, the region 88 may cover several units. In this case, for the fourth selection method, location relation between the units and region 88 may be set not only by controlling location of the units, but also controlling location of the region 88. Person of the art should be understood that in theory the present selection method may also apply to kinds of graphical user interfaces described in the immediately previous embodiment by making a slight change.

(F) Selection method in case of dynamically generating the target selection region 88.

Figure 8:
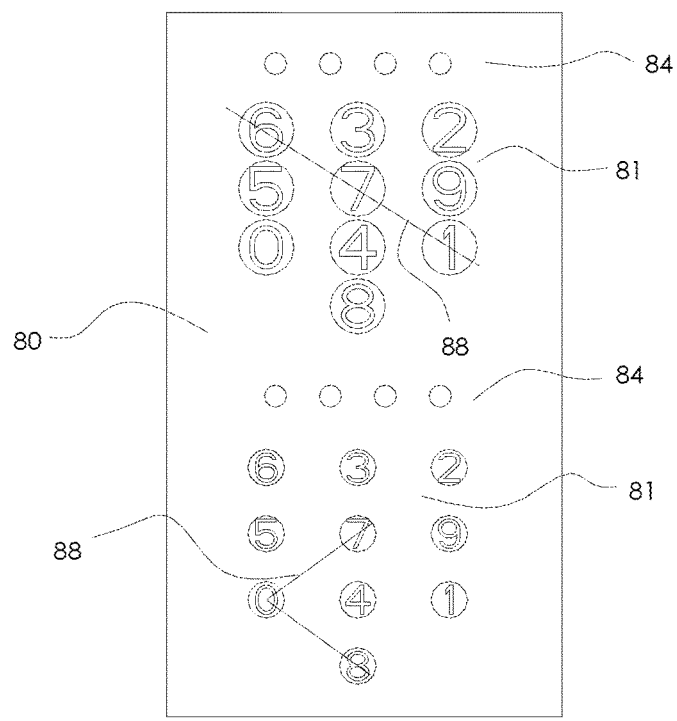
FIG. 8 shows a graphical user interface according to a second embodiment of a multi-vocal password verifying method of the invention, where two keyboard layouts through which the target selection region may be determined by sliding of the user finger are shown.

As shown in FIG. 8, this method is easier to manual operate. Specifically, reference may be made to the first selection method such that the candidate information units are displayed statically or dynamically. Accordingly, finger sliding of the user may realize selection of the target selection region 88. When the user makes selection of the desired candidate information units, he can slide his finger on several candidate information units and ensure the selection region range formed by finger sliding covers the desired candidate information units, no matter whether the display regions and candidate information units contained therein move. However, it should be noted that a valid sliding selection exists only when the selection region generated by finger sliding covers at least two candidate information units as required by the program. By this manner, the target selection region 88 is defined. The first instruction is triggered when the user beings to slide his finger. Continue sliding of user finger and final departing from the screen signals release or completion of the user instruction, or triggering of a second event by the user. That is, a second user instruction is triggered. The difference between the first and second instructions may be made by the programmer with flexibility, and this difference has no influence on selection of the region 88 by the user. The selection region is formed by triggering of the first and second user instructions. It is well known that the selection region formed by sliding of user finger is not definitely accurate and may contain certain tolerance. Consequently, determination of the region 88 by user finger sliding and regarding the candidate information units falling within the region 88 as the set of selection information units, shares in essence the same principle underlying the aforementioned various selection methods and they still fall within the scope and spirit of the invention. It is noted that determination of the region 88 by finger sliding may be interpreted as many user instructions and therefore, there must be a final instruction (the second instruction) to designate the final location of the region 88. By this manner, the relative location between the target selection region 88 and candidate information units is set. Ideally more candidate information units will be covered if the range of user finger sliding is wider. In this case, if the program has restricted the maximum number of the candidate information units, then the candidate information units located in a beginning area of the region 88 may be considered as valid set of selection information units, while the rest candidate information units may be regarded as interfering factors, thus enhancing multi-vocal expression effect of the invention.

The graphical user interface 80 of FIG. 8 demonstrates operation effects of the current selection method. In the interface 80 there are two consistent keyboard layouts located from top to bottom. The upper keyboard layout is supposed to realize verification of the first location of the predefined password "1788". In this situation, the corresponding set of selection information units may be constructed by sliding of the finger across the characters "6", "7" and "1". The lower keyboard layout is supposed to realize verification of the second location of the predefined password "1788". In this situation, the corresponding set of selection information units may be constructed by sliding of the finger across the characters "7", "3" and "1". However, it should be noted that several keyboard layouts on an interface is to illustrate verification process of password and should not be limited to it. Person of the art should know that only one keyboard layout may be provided to the interface.

When performing said finger sliding, the target selection region may or may not occur visually on the screen. The former makes the candidate information units chosen by the user more intuitive thus enhancing interaction; while the latter makes the candidate information units more hidden hence enhancing safety.

Though in this method the region 88 is preferably generated dynamically by finger sliding on the touch screen 3, person of the art should understand that similar selecting of the region 88 may also be achieved by for example interpretation by a camera or infra-red sensor of floating gesture not imposed on the touch screen as a set of user instructions similar to those generated through finger sliding. Similarly, other alternative means such as visual motion or screen tilting may also realize selection method.

By now various methods of selecting the target selection region 88 have been described in above embodiments. Person of the art should note that according to the spirit reflected by examples of the invention and kinds of input sources thus disclosed and understanding of well-known means in the art, numerous methods of selecting the target selection region 88 may be presented. No matter whether the region 88 is defined in advance by program plotting or designated by the user in real time during the verification process, all these means fall within the scope of the invention.

Please continue to refer to FIG. 2, a third step of the multi-vocal password verifying method of the invention is important. In this embodiment, the set of selection information units has been obtained in previous two steps and therefore in the third step, the set of selection information units are further utilized. After the set of selection information units are obtained in this step, and information units of the predefined password to be verified are compared to the set of selection information units. When it is determined that the set of selection information units contain the information units to be verified, it is confirmed that the user has chosen correct information units of the predefined password. In other words, the user has correctly chosen contents same as the information units of the predefined password. In this case, verification is successful.

As described above, it is noted that if the predefined password is stored in the present terminal (device), then the predefined password stored in the memory should be retrieved to perform above verification. In case that the predefined password is located in a remote terminal, then the set of selection information units may be transmitted to this terminal to perform the verification and finally, the result of verification is returned by the remote terminal server.

In addition, as used in this embodiment, the candidate information units and information units of the predefined password are simplified to contain only single information element for easy description. Therefore, when the information units of the predefined password are compared to the set of selection information units, the information units of the predefined password may be thoroughly compared to the elements of the set of selection information units. However as mentioned above, the candidate information unit may include several information elements. For example, assume that the first digit of predefined password is "1". In the display region 81 of FIG. 4, four characters "1" are expressed in red, green, blue and yellow respectively. In other words, the candidate information units in the display region 81 indeed contain two kinds of information elements, one of which is character element, while the other is color element. The character element is combined with the color element. Of course, one of the two information elements may be pattern or image, while the other character. Pattern (image) may be of a square or circle. When the two information elements are visually expressed, the character may be surrounded by the pattern (image). The two information elements may also be card pattern such as heart, club, spade or shape of some article. When visually expressing the elements, one pattern may be close to the image. In predefined password as described above for simplicity, only a single character element is employed as the sole information element of the information units. Under this circumstance, the information element of the unit of the predefined password forms the entire information unit. When comparison is made between the information unit of the password and set of selection information units, the information (or information element) of the password should not be directly compared to elements of the set. Rather, the information (or information element) of the password should be compared with each information element of the set. In other words, the information (or information element) of the password should be compared to the elements themselves of the set. In this situation, as long as the information (or information element) of the password is identical to a specific unit of the set, i.e., the information (or information element) of the password should is included in this unit of the set, it is confirmed that the user has chosen correct information units of the predefined password. Regarding information element, the term "identical (equal)" as used herein means that a specific information element of the information unit of the predefined password shares the same content with a specific information element of the information unit of the set of selection information units. Regarding information unit, the term "identical (equal)" as used herein means that a specific information unit of the predefined password shares the same information element(s) with a specific information unit of the set of selection information units.

This also applies to embodiments where the information unit of the predefined password contains at least two information elements. For example, it is assumed that the predefined password of a certified device contains several information units, and each information unit includes two kinds of information elements such as character element and color element for expression of the character color. They may e.g. include green character "1", red character "7", yellow character "8" and green character "8". In general, when performing password verification using the certified device, it is impossible to verify the password only by inputting a string of characters "1788" without color. Rather, each character with a particular color should be inputted in sequence. These characters with their specific color together form the entire correct information unit and only in this case, it is confirmed that the verification is ok. This is reflected in the third step of the invention. When making comparison, all information elements of the unit of the predefined password should be compared to all the elements of the information unit of the set. It is confirmed that the user has input correct information unit of the predefined password only if each information element of the unit of the password belongs to or identical to a corresponding information element of the information unit of the set.

To further enhance fuzzy effect, in a variation of the above embodiment where the candidate information unit contains plural information elements, two or more candidate information units may be selected from a same set of candidate information units; or one or more units may be selected from different sets of candidate information units; and these selected units may be configured to have at least one identical information element. Take character "1" of the predefined password "1788" including only one kind of element in the unit as an example. The four characters "1" as shown in FIG. 6 may be displayed in red, green or blue or yellow respectively. Alternatively, some discrete characters of FIG. 6 may have the same color. As such, the stealer should notice not only the difference among the characters, but also difference in color. This to some extent will cause confusion to the stealer. Apparently, when this variation embodiment is combined with another embodiment where the information unit of the predefined password contains at least two information elements, multi-vocal expression effect is further enhanced. More specifically, it is assumed that the predefined password contains information unit of red character "1", and the display region 81 of FIG. 6 contains four characters "1" in different color. In this case, the stealer must remember both the number "1" selected by the user and its color and accordingly, this will increase difficulty of the person to strongly remember the password.

Evidently, by configuring the candidate information unit to have at least two information elements, multi-vocal expression of the candidate information unit is further enhanced. Alternatively speaking, fuzzy of content selected by the user becomes enhanced and as a result, it will be hard for a stealer to crack down the password by strongly remembering or analysis of user motions. Even the stealer employs data stream interception, as the same set of selection information units contains several candidate information units selected by the user, and the selected unit also contains several information elements, cracking by this means still face great challenge. Therefore, inclusion of several elements in a candidate information unit is more suitable for remote password verification, for example Wi-Fi password verification, webpage password verification or the like.

In a typical embodiment of the multi-vocal password verifying method as described above, the candidate information units with fixed location is considered in addition to the case where the candidate information units are dynamically displayed in the display region 81. It is noted that dynamical display of the candidate information units means the candidate information units are grouped and confined in the region 81. Therefore, movement of the candidate information units is highly limited. Indeed the display region 81 may be expanded to cover the entire graphical user interface 80 and, the invention is not limited by the virtual or real boundary of the display region 81. This permits the candidate information units to have wider range of floating. As such, the dynamic display effect of the invention is further enhanced, and more dynamic human-machine interaction interface is thus provided.

It should be iterated that the display region 81 of the candidate information units may be of any shape. The movement manner of the target selection region 88 may also be adjusted suitably. Further description of the shape and movement is omitted herefrom so as not to obscure the invention.

A typical embodiment of the multi-vocal password verifying method of the invention has been illustrated above in details. The above verifying method is discussed in terms of specific digit of information unit of the predefined password. in previous embodiment, kinds of verification methods of multi-digit password have been simply introduced. These methods and their variations may also apply to the present embodiment. The following are further repetition of them.

According to a first verification method of multi-digit password, each information unit of the predefined password may be verified in sequence based on the multi-vocal password verifying method of the invention. When the user select all the correct information units, message on predefined password verification successful is output as a result and is provided to subsequent programs for use including program for performing unlock action, program for performing subsequent operations and the like. This manner is comparatively traditional and is widely employed. A typical use of it can be found in screen unlock of the mobile terminal, password verification of ATM and webpage password verification process. This will be understood by person of the art and therefore no further description is provided.

According to a second verification method of multi-digit password and with reference to FIG. 8 which shows an upper keyboard layout, it may be done in a manner similar to the sixth target selection region 88 as discussed in previous embodiment. In particular, when performing the second step of the multi-vocal password verifying method of the invention, corresponding to the several information units, the user is permitted to select at a time all the regions 88 in a manner similar to the sixth target selection region 88. When performing the third step of the multi-vocal password verifying method of the invention, according to the location sequence of the information units contained in the predefined password, the selection information units constructed by respective target selection region 88 may be compared to information units at corresponding location of the predefined password. When information units at corresponding location of the predefined password can be found in corresponding location of the specific target selection region 88, it is determined that the user has chosen correct information units of the password. In other words, when all the information units of the predefined password can be found in the set of the selection information units of the region 88, verification of the entire string of password is ok and subsequently, signals indicating successful verification of the entire string of password may be output for subsequent operation.

A third verification method of multi-digit password is improved upon the second method and there are some differences between the two methods. In the second verification method of multi-digit password, it is emphasized that comparison is made one by one between the information units of the predefined password according to their arrangement order and set of the selection information units corresponding to the region 88. By contrast, in the third verification method of multi-digit password, there is no need to consider the arrange order; rather when the set of selection information units of any one target selection region 88 include any one of information units of the predefined password, conclusion can be drawn that the set of selection information units have included the correct information unit of a specific location of the predefined password. This method reduces difficulty to crack the password and therefore has low safety. However, this method has lower hardware requirement. Accordingly, this method applies to password verification implemented by single-chip.

Some circles 84 are shown above respective graphical user interfaces 80 of FIGS. 6-8 for indicating verification status of information units of a predefined password. This circle design is well known in the art and therefore no further description is provided.

In above kinds of verification method of multi-digit password, to increase complexity, the number of the candidate information units covered by the target selection region 88 prior to verification of each information unit may be prescribed and make sure that the number is equal for all information units. In this case, for each information unit of the predefined password, there is a corresponding set of selection information units having a fixed number of elements. This necessarily increases computing complexity, and it is harder for the stealer to crack down the password by peeping or strong remembering.

In summary, through the present invention is described in mainly two embodiments, the invention in fact includes various variation embodiments. Clearly, kinds of programs may be designed by person of the art after reading the multi-vocal password verifying method of the invention. Accordingly, kinds of human-machine interaction interfaces are formed. The password verification performed by the present multi-vocal password verifying method brings good effects such as vagueness of explicit expression and use convenience of user operation, and is therefore more reliable.

It should be emphasized that various software programs may be formed due to use of different program language, different programming style and the like. The above embodiments are only for illustrative and are not for limiting the scope of the invention.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A multi-vocal password verifying method, for verifying whether a plurality of candidate information units chosen by a user include corresponding information units of a predefined password, comprising the steps of:
   (1) displaying a plurality of sets of candidate information units each including at least two information units and a target selection region, the information units of the predefined password being included in the plurality of sets of candidate information units for selection by the user, the plurality of sets of candidate information units including other candidate information units different from the information units of the predefined password, wherein the target selection region is displayed to the user before a user selection of an information unit from at least one set of candidate information units is initiated by the user;
   (2) accepting setting of a relative location between the target selection region and the plurality of sets of candidate information units such that two or more candidate information units from the plurality of sets of candidate information units are covered by the target selection region, the candidate information units covered by the target selection region being defined as a selection information unit set;
   (3) comparing one information unit of the predefined password with each of the two or more candidate information units of the selection information unit set which are covered by the target selection region, and it being determined that the user has chosen a correct candidate information unit identical to said one information unit of the predefined password when the selection information unit set covered by the target selection region contains said one information unit of the predefined password; and,
   (4) repeating steps (2) to (3) for each of the rest information units of the predefined password.

2. The multi-vocal password verifying method according to claim 1, wherein all candidate information units of all sets of candidate information units are statically displayed with their locations being fixed.

3. The multi-vocal password verifying method according to claim 1, wherein at least part of candidate information units of at least one set of candidate information units are dynamically displayed with their locations being changed in real time.

4. The multi-vocal password verifying method according to claim 3, wherein the target selection region has a defined location; two or more candidate information units of the dynamically displayed set of candidate information unit are covered by the target selection region at a time; and when triggered by instructions of the user, all candidate information units covered currently by the target selection region are chosen as the selection information unit set.

5. The multi-vocal password verifying method according to claim 1, wherein location of any candidate information unit determined by the user is received such that several candidate information units are covered by the target selection region so as to realize subsequent selection.

6. The multi-vocal password verifying method according to claim 1, wherein the location of the target selection region determined by the user is received such that several candidate information units are covered by the target selection region so as to realize subsequent selection.

7. The multi-vocal password verifying method according to claim 6, wherein the location of the target selection region is finally determined by the user; and when the target selection region is finally determined by the user all the candidate information units covered by the target selection region constitute the selection information unit set.

8. The multi-vocal password verifying method according to claim 7, wherein the target selection region moves with its location being changed; and the location of the target selection region is determined when the instructions or a second instruction are issued by the user.

9. The multi-vocal password verifying method according to claim 7, wherein the initial location of the target selection region is determined; the target selection regions begins to move when the instructions of the user are issued; when the instruction is finished or after the second instruction is issued by the user, the location of the region is fixed; and all the candidate information units covered by the region at this time form the selection information unit set.

10. The multi-vocal password verifying method according to claim 1, wherein there are multiple sets of candidate information units; and the candidate information units covered by the target region come from at least two sets of candidate information units.

11. The multi-vocal password verifying method according to claim 1, wherein there are multiple sets of candidate information units; and each set of candidate information units are confined in a specific display region and are displayed thereby.

12. The multi-vocal password verifying method according to claim 11, wherein the display region of each set of candidate information units is of a circle or arc shape; and the display regions of several sets of candidate information units are concentric with each other.

13. The multi-vocal password verifying method according to claim 11, wherein the display region of each set of candidate information units is of a rectangular shape; and the display regions of several sets of candidate information units are arranged side by side or parallel to each other.

14. The multi-vocal password verifying method according to claim 11, wherein when the candidate information unit is moveably displayed, its movement range is limited to a specific display region corresponding to the set of candidate information units.

15. The multi-vocal password verifying method according to claim 3, wherein all the candidate information units of all sets of candidate information units are displayed in a floating animation.

16. The multi-vocal password verifying method according to claim 1, wherein an instruction input source, which is corresponding to the selection of the target region, is provided by any one or more of the following components: microphone, gyro, physical button, touch screen, camera head, infra-red sensor and vibration sensor.

17. The multi-vocal password verifying method according to claim 1, wherein the candidate information unit includes visual information.

18. The multi-vocal password verifying method according to claim 1, wherein the candidate information unit is any one or combination of the following information elements: character, color, font, font size, pattern or image.

19. The multi-vocal password verifying method according to claim 18, wherein the candidate information unit is a character with color; and in the step (1), the character is displayed in said color.

20. The multi-vocal password verifying method according to claim 18, wherein each candidate information unit contains two or more said information elements.

21. The multi-vocal password verifying method according to claim 20, wherein more than two candidate information units of a set of candidate information unit share at least one completely identical information element; or, more than one candidate information units of different sets of candidate information units share at least one completely identical information element.

22. The multi-vocal password verifying method according to claim 1, wherein covering of the candidate information units by the target region means that in a visual plane, the candidate information units fall within the boundary of the target region and/or cross the boundary.

23. The multi-vocal password verifying method according to claim 1, wherein at least one of the target region and candidate information unit is provided to the user to determine relative location between the region and candidate information unit so that the number of the candidate information units covered by the target region is set to be two or more by the user according to desire.

24. The multi-vocal password verifying method according to claim 1, wherein in the step (1), each time each set of candidate information units is displayed, all the candidate information units of the set are randomly arranged and then displayed according to this sequence.

25. The multi-vocal password verifying method according to claim 1, wherein when the predefined password includes several information units, the method applies to each information unit regarding sequence; and when the user has chosen all correct information units, signal indicating the entire password has been successfully verified is output.

26. A password verifying device for performing a multi-vocal password verifying method, comprising a storage unit for storing a program configured to implement the method of claim 1, a control unit for executing the program, and a display screen for displaying a graphical user interface of the method.

27. A multi-vocal password verifying method, for verifying whether a plurality of candidate information units chosen by a user include corresponding information units of a predefined password, comprising the steps of:
(1) displaying a plurality of sets of candidate information units each including at least two information units and a plurality of target selection regions, the information units of the predefined password being included in the plurality of sets of candidate information units for selection by the user, the plurality of sets of candidate information units including other candidate information units different from the information units of the predefined password, wherein the target selection regions are displayed to the user before a user selection of an information unit from at least one set of candidate information units is initiated by the user;

(2) accepting setting of relative locations between each target selection region and the plurality of sets of candidate information units such that two or more candidate information units from the plurality of sets of candidate information units are covered by each target selection region, the candidate information units covered by each target selection region being defined as a selection information unit set; and (3) comparing a respective information unit of the predefined password with each of the two or more candidate information units of a corresponding selection information unit set covered by a corresponding target selection region, and it being determined that the user has chosen a correct candidate information unit identical to a corresponding information unit of the predefined password when said corresponding selection information unit set covered by said corresponding target selection region contains said corresponding information unit of the predefined password, and repeating the comparing for each of the respective information units of the predefined password.

* * * * *